US012675696B2

(12) United States Patent
Zheng et al.

(10) Patent No.: US 12,675,696 B2
(45) Date of Patent: Jul. 7, 2026

(54) SPARSITY FOR NEURAL NETWORK MODELS BASED ON SPARSITY ATTRIBUTES

(71) Applicant: Microsoft Technology Licensing, LLC, Redmond, WA (US)

(72) Inventors: Ningxin Zheng, Shanghai (CN); Quanlu Zhang, Beijing (CN); Yuqing Yang, Shanghai (CN); Lingxiao Ma, Beijing (CN); Fan Yang, Beijing (CN); Yang Wang, Beijing (CN); Mao Yang, Beijing (CN); Lidong Zhou, Beijing (CN)

( * ) Notice: Subject to any disclaimer, the term of this patent is extended or adjusted under 35 U.S.C. 154(b) by 961 days.

(21) Appl. No.: 17/850,807

(22) Filed: Jun. 27, 2022

(65) Prior Publication Data

US 2023/0419116 A1 Dec. 28, 2023

(51) Int. Cl.
*G06N 3/082* (2023.01)
*G06N 3/084* (2023.01)

(52) U.S. Cl.
CPC ............. *G06N 3/082* (2013.01); *G06N 3/084* (2013.01)

(58) Field of Classification Search
CPC ....... G06N 3/082; G06N 3/084; G06N 3/0495
See application file for complete search history.

(56) References Cited

U.S. PATENT DOCUMENTS

| | | | |
|---|---|---|---|
| 11,176,439 B2 | 11/2021 | Chen et al. | |
| 11,625,584 B2 * | 4/2023 | Kumar | G06F 7/5443 |
| | | | 706/15 |
| 2021/0012209 A1 * | 1/2021 | Sikka | G06N 3/084 |

OTHER PUBLICATIONS

S. Rajbhandari, et al., "Optimizing cnns on multicores for scalability, performance and goodput," in Proceedings of the TwentySecond International Conference on Architectural Support for Programming Languages and Operating Systems, ASPLOS 2017, Xi'an, China Apr. 8-12, 2017, 2017, pp. 267-280. (Year: 2017).*
Blair et al., Interaction of Multiple Tensor Product Operators of the Same Type: an Introduction, pp. 1-15, arXiv:2106.15576 ( Year: 2021).*
Rawn Tristan Henry. 2020. A framework for computing on sparse tensors based on operator properties, pp. 1-105. Ph. D. Dissertation. USA (Year: 2020).*
Zhuo, et al., "Sparse Matrix-Vector Multiplication on FPGAs", In Proceedings of ACM/SIGDA 13th International Symposium on Field-Programmable Gate Arrays, Feb. 20, 2005, pp. 63-74.
Kjolstad, et al., "The Tensor Algebra Compiler", In Proceedings of ACM on Programming Languages, vol. 1, Issue OOPSLA, Article No. 77, Oct. 12, 2017, 29 Pages.

(Continued)

*Primary Examiner* — Cheyne D Ly
(74) *Attorney, Agent, or Firm* — Foley IP Law, PLLC

(57) ABSTRACT

Embodiments of the present disclosure include systems and methods for providing sparsity for neural network models based on sparsity attributes. A first neural network model definition is received. The first neural network model definition specifies a neural network model comprising a set of tensors and a set of sparsity attribute values for elements of a tensor in the set of tensors. The set of sparsity attribute values for the tensor are propagated to elements of a subset of the set of tensors to form a second neural network model definition. The neural network model is generated based on the second neural network model definition.

20 Claims, 13 Drawing Sheets

(56)          References Cited

OTHER PUBLICATIONS

Konolige, et al., "Apache / Tvm", Retrieved from: https://github.com/apache/tvm/blob/254563a3140cf63fe77a46058688209de3aa213c/python/tvm/topi/cuda/sparse.py#L96, May 5, 2021, 10 Pages.

Lee, et al., "SNIP: Single-shot Network Pruning based on Connection Sensitivity", In Repository of arXiv:1810.02340v1, Oct. 4, 2018, 12 Pages.

Li, et al., "Pruning Filters for Efficient ConvNets", In Repository of arXiv:1608.08710v1, Aug. 31, 2016, 9 Pages.

Lin, et al., "Fixed Point Quantization of Deep Convolutional Networks", In Proceedings of 33rd International Conference on Machine Learning, Jun. 20, 2016, 10 Pages.

Liu, et al., "Atom-Substituted Tensor Dictionary Learning Enhanced Convolutional Neural Network for Hyperspectral Image Classification", In Journal of Neurocomputing, vol. 455, Sep. 30, 2021.

Liu, et al., "AutoCompress: An Automatic DNN Structured Pruning Framework for Ultra-High Compression Rates", In Proceedings of AAAI Conference on Artificial Intelligence, vol. 34, Issue 04, Apr. 3, 2020, pp. 4876-4883.

Liu, et al., "Learning Efficient Convolutional Networks Through Network Slimming", In Proceedings of IEEE International Conference on Computer Vision, Oct. 2017, pp. 2736-2744.

Ma, et al., "Rammer: Enabling Holistic Deep Learning Compiler Optimizations with rTasks", In Proceedings of 14th USENIX Symposium on Operating Systems Design and Implementation, Nov. 4, 2020, pp. 881-897.

Mao, et al., "Exploring the Regularity of Sparse Structure in Convolutional Neural Networks", In Repository of arXiv:1705.08922v1, May 24, 2017, 10 Pages.

Michel, et al., "Are Sixteen Heads Really Better than One?", In Repository of arXiv:1905.10650v1, May 25, 2019, 11 Pages.

Narang, et al., "Block-Sparse Recurrent Neural Networks", In Repository of arXiv:1711.02782v1, Nov. 8, 2017, 12 pages.

Nash, et al., "An Introduction to Convolutional Neural Networks", In Repository of arXiv:1511.08458v1, Nov. 26, 2015, 8 Pages.

Parashar, et al., "SCNN: An Accelerator for Compressed-sparse Convolutional Neural Networks", In Journal of ACM SIGARCH Computer Architecture News, vol. 45, Issue 2, Jun. 24, 2017, pp. 27-40.

Park, et al., "Energy-Efficient Neural Network Accelerator Based on Outlier-Aware Low-Precision Computation", In Proceedings of ACM/IEEE 45th Annual International Symposium on Computer Architecture, Jun. 1, 2018, pp. 688-698.

Paszke, et al., "PyTorch: An Imperative Style, High-Performance Deep Learning Library", In Journal of Advances in Neural Information Processing Systems, vol. 32, 2019, 12 Pages.

Pinar, et al., "Improving Performance of Sparse Matrix-Vector Multiplication", In Proceedings of ACM/IEEE Conference on Supercomputing, Nov. 13, 1999, 9 Pages.

Pool, et al., "Accelerating Inference with Sparsity Using the NVIDIA Ampere Architecture and NVIDIA TensorRT", Retrieved from: https://developer.nvidia.com/blog/accelerating-inference-with-sparsity-using-ampere-and-tensorrt/, Jul. 20, 2021, 5 Pages.

Rangan, et al., "Zeroploit: Exploiting Zero Valued Operands in Interactive Gaming Applications", In Journal of ACM Transactions on Architecture and Code Optimization, vol. 17, Issue 3, Article No. 17, Aug. 3, 2020, 26 Pages.

Sandham, James, "ROCmSoftwarePlatform / hipSPARSE", Retrieved from: https://github.com/ROCmSoftwarePlatform/hipSPARSE, Jun. 13, 2022, 3 Pages.

Senanayake, et al., "A Sparse Iteration Space Transformation Framework for Sparse Tensor Algebra", In Proceedings of ACM on Programming Languages, vol. 4, Issue OOPSLA, Article No. 158, Nov. 13, 2020, 30 Pages.

Senanayake, Ryan, "Tensor-Compiler / Taco", Retrieved from: https://github.com/tensor-compiler/taco/tree/oopsla2020, Oct. 15, 2020, 5 Pages.

Stephenson, et al., "PGZ: Automatic Zero-Value Code Specialization", In Proceedings of 30th ACM SIGPLAN International Conference on Compiler Construction, Mar. 2, 2021, pp. 36-46.

Tay, et al., "Efficient Transformers: A Survey", In Repository of arXiv:2009.06732v1, Sep. 14, 2020, 28 Pages.

Tishby, et al., "The Information Bottleneck Method", In Repository of arXiv:physics/0004057v1, Apr. 24, 2000, 16 Pages.

Tung, et al., "CLIP-Q: Deep Network Compression Learning by In-Parallel Pruning-Quantization", In Proceedings of IEEE Conference on Computer Vision and Pattern Recognition, Jun. 2018, pp. 7873-7882.

Tung, et al., "Deep Neural Network Compression by In-Parallel Pruning-Quantization", In Proceedings of IEEE Transactions on Pattern Analysis and Machine Intelligence, vol. 42, Issue 3, Mar. 2020, pp. 568-579.

Wang, et al., "Differentiable Joint Pruning and Quantization for Hardware Efficiency", In Proceedings of European Conference on Computer Vision, Oct. 7, 2020, pp. 259-277.

Wang, et al., "HAQ: Hardware-Aware Automated Quantization With Mixed Precision", In Proceedings of IEEE/CVF Conference on Computer Vision and Pattern Recognition, Jun. 2019, pp. 8612-8620.

Wang, Ziheng, "SparseDNN: Fast Sparse Deep Learning Inference on CPUs", In Repository of arXiv:2101.07948v4, Jul. 21, 2021, 10 Pages.

Wang, et al., "SparseRT: Accelerating Unstructured Sparsity on GPUs for Deep Learning Inference", In Proceedings of ACM International Conference on Parallel Architectures and Compilation Techniques, Oct. 3, 2020, pp. 31-42.

Wang, et al., "SpAtten: Efficient Sparse Attention Architecture with Cascade Token and Head Pruning", In Proceedings of IEEE International Symposium on High-Performance Computer Architecture, Feb. 27, 2021, pp. 97-110.

Williams, et al., "Optimization of Sparse Matrix-Vector Multiplication on Emerging Multicore Platforms", In Proceedings of ACM/IEEE Conference on Supercomputing, Nov. 10, 2007, 12 Pages.

Xu, et al., "GSPMD: General and Scalable Parallelization for ML Computation Graphs", In Repository of arXiv:2105.04663v1, May 10, 2021, 16 Pages.

Yang, et al., "Automatic Neural Network Compression by Sparsity-Quantization Joint Learning: A Constrained Optimization-Based Approach", In Proceedings of IEEE/CVF Conference on Computer Vision and Pattern Recognition, Jun. 2020, pp. 2178-2188.

Yang, et al., "Mixed-Precision Embedding Using a Cache", In Repository of arXiv:2010.11305v1, Oct. 21, 2020, 14 Pages.

Yang, et al., "NetAdapt: Platform-Aware Neural Network Adaptation for Mobile Applications", In Proceedings of European Conference on Computer Vision, Sep. 2018, 16 Pages.

Yang, et al., "SUPERB: Speech Processing Universal Performance Benchmark", In Repository of arXiv:2105.01051v1, May 3, 2021, 5 Pages.

Yao, et al., "Balanced Sparsity for Efficient DNN Inference on GPU", In Proceedings of AAAI Conference on Artificial Intelligence, vol. 33, Issue 1, Jul. 17, 2019, pp. 5676-5683.

Yao, et al., "MLPruning: A Multilevel Structured Pruning Framework for Transformer-Based Models", In Repository of arXiv:2105.14636v1, May 30, 2021, 20 Pages.

Yoshida, et al., "Natural Images are Reliably Represented by Sparse and Variable Populations of Neurons in Visual Cortex", In Journal of Nature Communications, vol. 11, Issue 1, Feb. 13, 2020, 19 Pages.

Zhao, et al., "Focused Quantization for Sparse CNNs", In Repository of arXiv:1903.03046v2, Oct. 25, 2019, 11 Pages.

Zheng, et al., "Ansor: Generating High-Performance Tensor Programs for Deep Learning", In Proceedings of 14th USENIX Symposium on Operating Systems Design and Implementation, Nov. 6, 2020, pp. 863-879.

Zhou, et al., "DoReFa-Net: Training Low Bitwidth Convolutional Neural Networks with Low Bitwidth Gradients", In Repository of arXiv:1606.06160v1, Jun. 20, 2016, 13 Pages.

Zhu, et al., "Sparse Tensor Core: Algorithm and Hardware Co-Design for Vector-Wise Sparse Neural Networks on Modern GPUs", In Proceedings of 52nd Annual IEEE/ACM International Symposium on Microarchitecture, Oct. 12, 2019, pp. 359-371.

(56)　　　　　References Cited

OTHER PUBLICATIONS

Zhu, et al., "To Prune, or not to Prune: Exploring the Efficacy of Pruning for Model Compression", In Repository of arXiv:1710.01878v1, Oct. 5, 2017, 11 Pages.
"AMD Radeon™ VII Graphics Card", Retrieved from: https://web.archive.org/web/20201110162232/https://www.amd.com/en/products/graphics/amd-radeon-vii, Nov. 10, 2020, 5 Pages.
"Cloud TPU", Retrieved from: https://web.archive.org/web/20210101152955/https://cloud.google.com/tpu/, Jan. 1, 2021, 12 Pages.
"CuBLAS Library", In User Guide of NVIDIA, DU-06702-001_v11.2, Feb. 25, 2021, 236 Pages.
"CUDA C++ Programming Guide", In Design Guide of NVIDIA, PG-02829-001_v11.2, Feb. 24, 2021, 375 Pages.
"CuSPARSE Library", In Guide of NVIDIA, DU-06709-001_v11.2, Mar. 2021, 336 Pages.
"CuSPARSELt: A High-Performance CUDA Library for Sparse Matrix-Matrix Multiplication", Retrieved from: https://web.archive.org/web/20220614030113/https://docs.nvidia.com/cuda/cusparselt/index.html, Jan. 28, 2021, 2 Pages.
"Deploy High-Performance Deep Learning Inference", Retrieved from: https://web.archive.org/web/20211016074303/https://www.intel.com/content/www/us/en/developer/tools/openvino-toolkit/overview.html, Oct. 16, 2021, 3 Pages.
"Einstein Notation", Retrieved from: https://web.archive.org/web/20210125093223/https://en.wikipedia.org/wiki/Einstein_notation, Jan. 25, 2021, 7 Pages.
"Geforce RTX", Retrieved from: https://web.archive.org/web/20210102094353/https://www.nvidia.com/en-us/geforce/20-series/, Jan. 2, 2021, 7 Pages.
"Graphcore", Retrieved from: https://web.archive.org/web/20210101040436/https://www.graphcore.ai/, Jan. 1, 2021, 4 Pages.
"Intel® FPGAs and Programmable Devices", Retrieved from: https://web.archive.org/web/20210101232818/https://www.intel.com/content/www/us/en/products/programmable.html, Jan. 1, 2021, 3 Pages.
"Intel® oneAPI Math Kernel Library", Retrieved from: https://web.archive.org/web/20211109075833/https://www.intel.com/content/www/us/en/developer/tools/oneapi/onemkl.html, Nov. 9, 2021, 7 Pages.
"New Intel Evo Platform-Based Laptops are Here", Retrieved from: https://web.archive.org/web/20210101001058/https://www.intel.com/content/www/us/en/homepage.html, Jan. 1, 2021, 1 Page.
"NVIDIA TensorRT", Retrieved from: https://web.archive.org/web/20211020160853/https://docs.nvidia.com/deeplearning/tensorrt/, Oct. 20, 2021, 1 Page.
"Open Neural Network Exchange", Retrieved from: https://web.archive.org/web/20210101135415/https://onnx.ai/, Jan. 1, 2021, 3 Pages.
"Set Cover Problem", Retrieved from: https://web.archive.org/web/20210119205733/https://en.wikipedia.org/wiki/Set_cover_problem, Jan. 19, 2021, 5 Pages.
Abadi, et al., "TensorFlow: A System for Large-Scale Machine Learning", In Proceedings of the 12th USENIX Symposium on Operating Systems Design and Implementation, Nov. 2, 2016, pp. 265-283.
Bell, et al., "Efficient Sparse Matrix-Vector Multiplication on CUDA", In Nvidia Technical Report NVR-2008-004, Dec. 11, 2008, 32 Pages.
Brown, et al., "Language Models are Few-Shot Learners", In Repository of arXiv:2005.14165v1, May 28, 2020, 72 Pages.
Buluç, et al., "Parallel Sparse Matrix-Vector and Matrix-Transpose-Vector Multiplication Using Compressed Sparse Blocks", In Proceedings of Twenty-First Annual Symposium on Parallelism in Algorithms and Architectures, Aug. 11, 2009, pp. 233-244.
Calder, et al., "Value Profiling and Optimization", In Journal of Instruction Level Parallelism, vol. 1, Issue 1, Mar. 1999, 37 Pages.
Cao, et al., "Efficient and Effective Sparse LSTM on FPGA with Bank-Balanced Sparsity", In Proceedings of ACM/SIGDA International Symposium on Field-Programmable Gate Arrays, Feb. 24, 2019, pp. 63-72.

Chen, et al., "TVM: An Automated End-to-End Optimizing Compiler for Deep Learning", In Proceedings of 13th USENIX Symposium on Operating Systems Design and Implementation, Oct. 8, 2018, pp. 579-594.
Chou, et al., "Automatic Generation of Efficient Sparse Tensor Format Conversion Routines", In Proceedings of 41st ACM SIGPLAN Conference on Programming Language Design and Implementation, Jun. 11, 2020, pp. 823-838.
Courbariaux, et al., "BinaryNet: Training Deep Neural Networks with Weights and Activations Constrained to +1 or −1", In Repository of arXiv:1602.02830v1, Feb. 9, 2016, 9 Pages.
Cun, et al., "Optimal Brain Damage", In Journal of Advances in Neural Information Processing Systems, vol. 2, 1989, pp. 598-605.
Damas, et al., "Principal Type-Schemes for Functional Programs", In Proceedings of 9th ACM SIGPLAN-SIGACT Symposium on Principles of Programming Languages, Jan. 25, 1982, pp. 207-212.
Deng, et al., "Imagenet: A Large-Scale Hierarchical Image Database", In Proceedings of IEEE Conference on Computer Vision and Pattern Recognition, Jun. 20, 2009, pp. 248-255.
Devlin, et al., "BERT: Pre-training of Deep Bidirectional Transformers for Language Understanding", In Repository of arXiv:1810.04805v1, Oct. 11, 2018, 14 Pages.
Dey, et al., "Pre-Defined Sparse Neural Networks with Hardware Acceleration", In Repository of arXiv:1812.01164v1, Dec. 4, 2018, 14 Pages.
Doerfert, et al., "Compiler Optimizations for OpenMP", In Proceedings of 14th International Workshop on OpenMP, Sep. 28, 2018, pp. 113-127.
Dong, et al., "Acorns: A Framework for Accelerating Deep Neural Networks with Input Sparsity", In Proceedings of 28th International Conference on Parallel Architectures and Compilation Techniques, Sep. 23, 2019, pp. 178-191.
Elthakeb, et al., "ReLeQ: An Automatic Reinforcement Learning Approach for Deep Quantization of Neural Networks", In Journal of NeurIPS ML for Systems Workshop, May 17, 2019, 9 Pages.
Fedus, et al., "Switch Transformers: Scaling to Trillion Parameter Models with Simple and Efficient Sparsity", In Repository of 2101.03961v1, Jan. 11, 2021, 31 Pages.
Foster, et al., "A Theory of Type Qualifiers", In Journal of ACM SIGPLAN Notices, vol. 34, Issue 5, May 1999, pp. 192-203.
Gale, et al., "Sparse GPU Kernels for Deep Learning", In Proceedings of International Conference for High Performance Computing, Networking, Storage and Analysis, Nov. 9, 2020, 14 Pages.
Gholami, et al., "A Survey of Quantization Methods for Efficient Neural Network Inference", In Repository of arXiv:2103.13630v1, Mar. 25, 2021, 27 Pages.
Han, et al., "Deep Compression: Compressing Deep Neural Networks with Pruning, Trained Quantization and Huffman Coding", In Repository of arXiv:1510.00149v3, Nov. 20, 2015, 13 Pages.
Han, et al., "EIE: Efficient Inference Engine on Compressed Deep Neural Network", In Journal of ACM SIGARCH Computer Architecture News, vol. 44, Issue 3, Jun. 18, 2016, pp. 243-254.
Han, et al., "Learning both Weights and Connections for Efficient Neural Networks", In Repository of arXiv:1506.02626v1, Jun. 8, 2015, 9 Pages.
Harris, Mark, "Mixed-Precision Programming with CUDA 8", Retrieved from https://developer.nvidia.com/accelerated-computing, Oct. 19, 2016, 6 Pages.
He, et al., "AMC: AutoML for Model Compression and Acceleration on Mobile Devices", In Proceedings of the European Conference on Computer Vision, Sep. 2018, 17 Pages.
He, et al., "Filter Pruning via Geometric Median for Deep Convolutional Neural Networks Acceleration", In Proceedings of IEEE/CVF Conference on Computer Vision and Pattern Recognition, Jun. 2019, pp. 4340-4349.
Hinton, et al., "Distilling the Knowledge in a Neural Network", In Repository of arXiv:1503.02531v1, Mar. 9, 2015, 9 Pages.
Hoefler, et al., "Sparsity in deep learning: pruning and growth for efficient inference and training in neural networks", In Repository of arXiv:2102.00554v1, Jan. 31, 2021, pp. 1-90.
Hong, et al., "Adaptive Sparse Tiling for Sparse Matrix Multiplication", In Proceedings of 24th Symposium on Principles and Practice of Parallel Programming, Feb. 16, 2019, pp. 300-314.

(56) References Cited

OTHER PUBLICATIONS

Howard, et al., "MobileNets: Efficient Convolutional Neural Networks for Mobile Vision Applications", In Repository of arXiv:1704.04861v1, Apr. 17, 2017, 9 Pages.

Hsu, et al., "HuBERT: Self-Supervised Speech Representation Learning by Masked Prediction of Hidden Units", In Repository of arXiv:2106.07447v1, Jun. 14, 2021, 10 Pages.

Iyer, et al., "Data At Quora: First Quora Dataset Release—Question Pairs", Retrieved from: https://www.forbes.com/sites/quora/2017/01/30/data-at-quora-first-quora-dataset-release-question-pairs/?sh=4e67b16c43bd, Jan. 30, 2017, 4 Pages.

Jacob, et al., "Quantization and Training of Neural Networks for Efficient Integer-Arithmetic-Only Inference", In Proceedings of IEEE Conference on Computer Vision and Pattern Recognition, Jun. 2018, pp. 2704-2713.

* cited by examiner

300

| Type | Computation | Computation in Algebra |
|---|---|---|
| Unary $f(x) \Rightarrow y$ | sin, cos, $|x|$, ReLU, etc. | $(x = \phi) \dashrightarrow (y = \phi)$ <br> $(x = \alpha) \dashrightarrow (y = \alpha)$ |
| Binary $f(x,y) \Rightarrow z$ | $+$, $-$ | $(x = \phi) \wedge (y = \phi) \dashrightarrow (z = \phi)$ <br> $(x = \alpha) \vee (y = \alpha) \dashrightarrow (z = \alpha)$ |
| | $\times$, $\div$, $x^y$ | $(x = \phi) \vee (y = \phi) \dashrightarrow (z = \phi)$ <br> $(x = \alpha) \wedge (y = \alpha) \dashrightarrow (z = \alpha)$ |

```
for (m1: int, 0, 2)
  for (n1: int, 0, 2)
    for (k1: int, 0, 2){
      ... ...
}
```

O0 += T0 * W0
O0 += T1 * W2
O1 += T0 * W1
O1 += T1 * W3
O2 += T2 * W0
O2 += T3 * W2
O3 += T2 * W1
O3 += T3 * W3

805

~~O0 += T0 * W0~~
O0 += T1 * W2
~~O1 += T0 * W1~~
O1 += T1 * W3
O2 += T2 * W0
~~O2 += T3 * W2~~
~~O3 += T2 * W1~~
~~O3 += T3 * W3~~

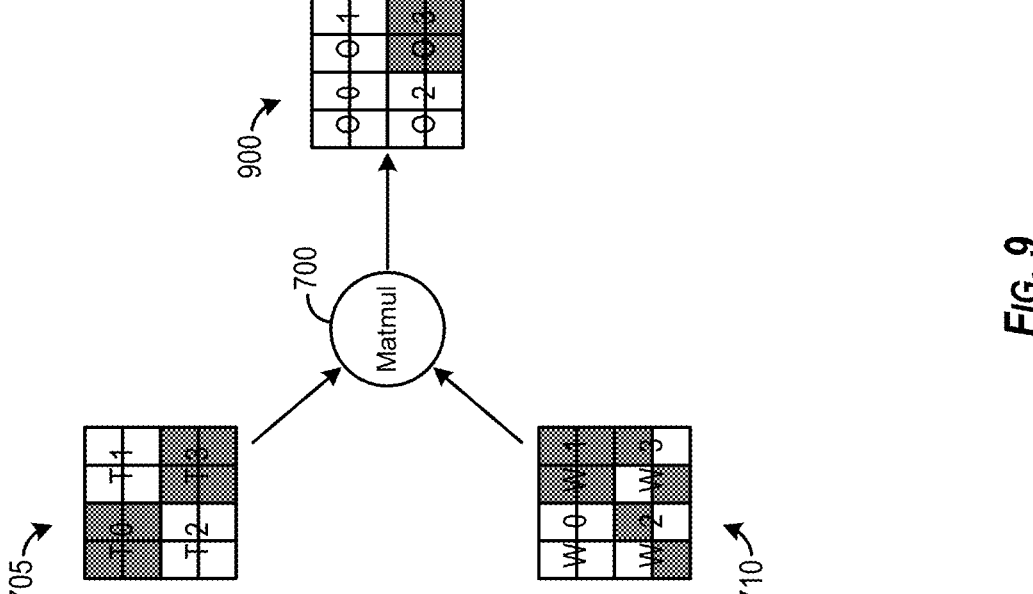
*FIG. 9*

1000

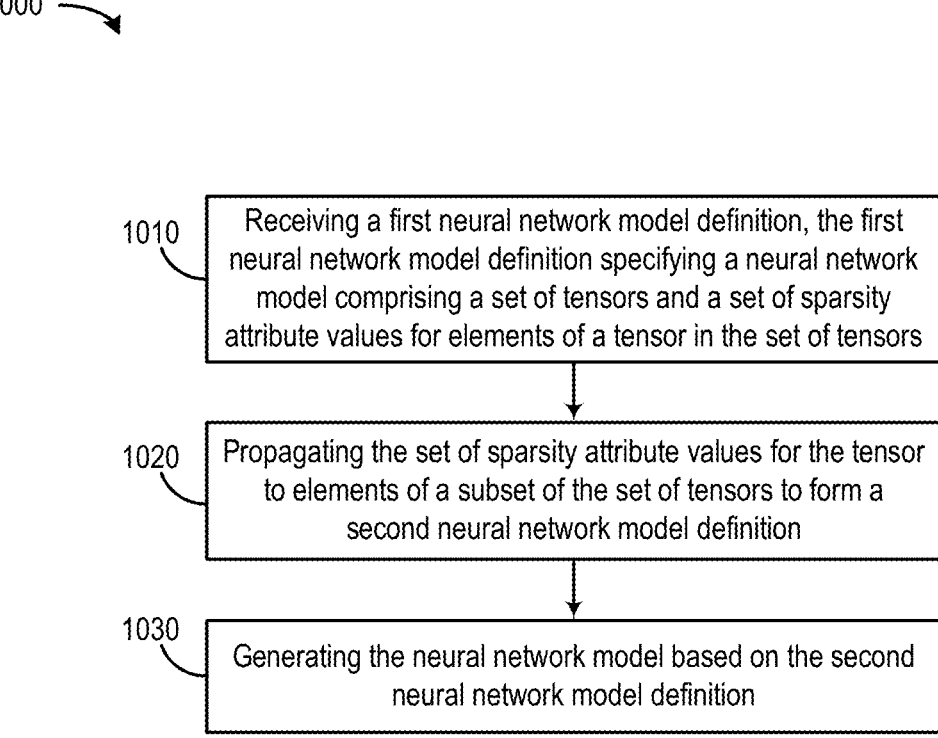

1010    Receiving a first neural network model definition, the first neural network model definition specifying a neural network model comprising a set of tensors and a set of sparsity attribute values for elements of a tensor in the set of tensors 1020    Propagating the set of sparsity attribute values for the tensor to elements of a subset of the set of tensors to form a second neural network model definition 1030    Generating the neural network model based on the second neural network model definition

*FIG. 10*

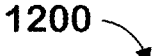
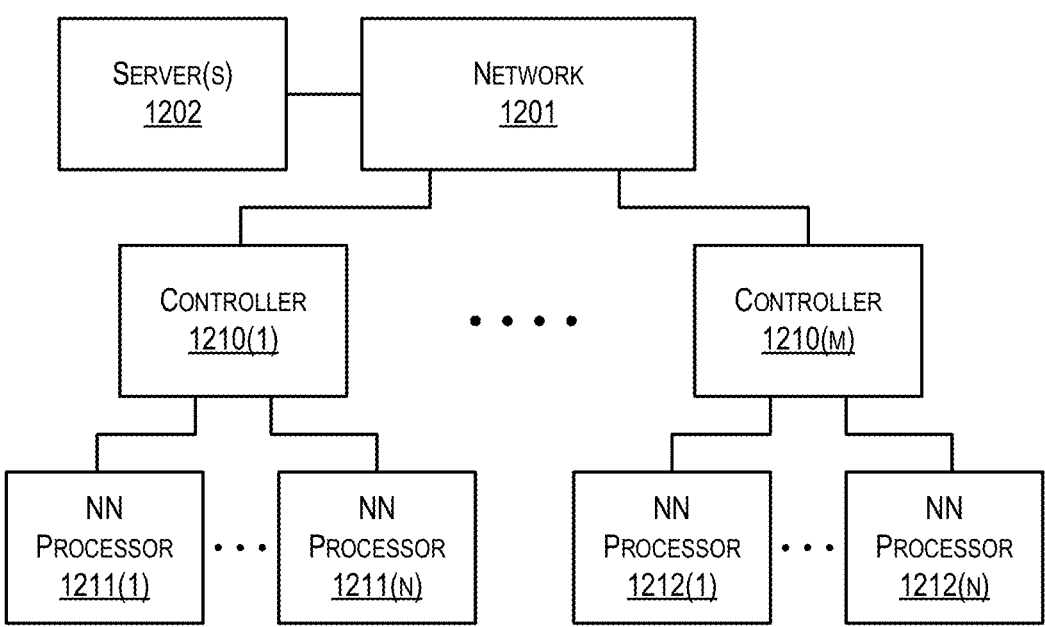
FIG. 12

SPARSITY FOR NEURAL NETWORK MODELS BASED ON SPARSITY ATTRIBUTES

BACKGROUND

The present disclosure relates to a computing system. More particularly, the present disclosure relates to techniques for building neural network models.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

Deep neural networks (DNNs) have grown exponentially in size over the past years in order to achieve better accuracies. Despite their high accuracies, DNNs typically need significant computational cost both in training and inference. Different types of techniques can be used to reduce computations costs associated with DNNs and/or reduce the size of DNNs. One type of technique is adding sparsity techniques. These techniques introduce sparsity to input data, weights, and/or activations.

BRIEF DESCRIPTION OF THE DRAWINGS

Various embodiments of the present disclosure are illustrated by way of example and not limitation in the figures of the accompanying drawings.

FIG. 3 illustrates example pruning rules according to some embodiments.

FIG. 9 illustrates a sparsified version of the operator illustrated in FIG. 7 according to some embodiments.

FIG. 10 illustrates a process for sparsifying a neural network model according to some embodiments.

FIG. 12 illustrates a neural network processing system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for providing sparsity for neural network models based on sparsity attributes. In some embodiments, a computing system is configured to provide sparsity for neural network models based on sparsity attributes. For example, the computing system can receive a neural network model definition specified in a data flow graph format that defines the neural network model in terms of tensors and operators for implementing the functionality of the neural network model. The computing system may receive sparsity attribute values for the elements of one or more tensors of the neural network model. The sparsity attribute values associated with a tensor can specify elements in the tensor to prune and/or elements in the tensor to quantize. Next, the computing system propagates sparsity attribute values associated with a particular tensor to other tensors in the neural network model to form an augmented version of the neural network model definition. Then, the computing system generates the neural network model specified in the neural network model definition. Generating a neural network model may include generating an execution plan, transforming operators in the neural network model into sub-operators, specializing code to generate more efficient code for the neural network model, etc. The generated neural network model is an executable version of the neural network model that can be executed on computing hardware.

Figure 1:
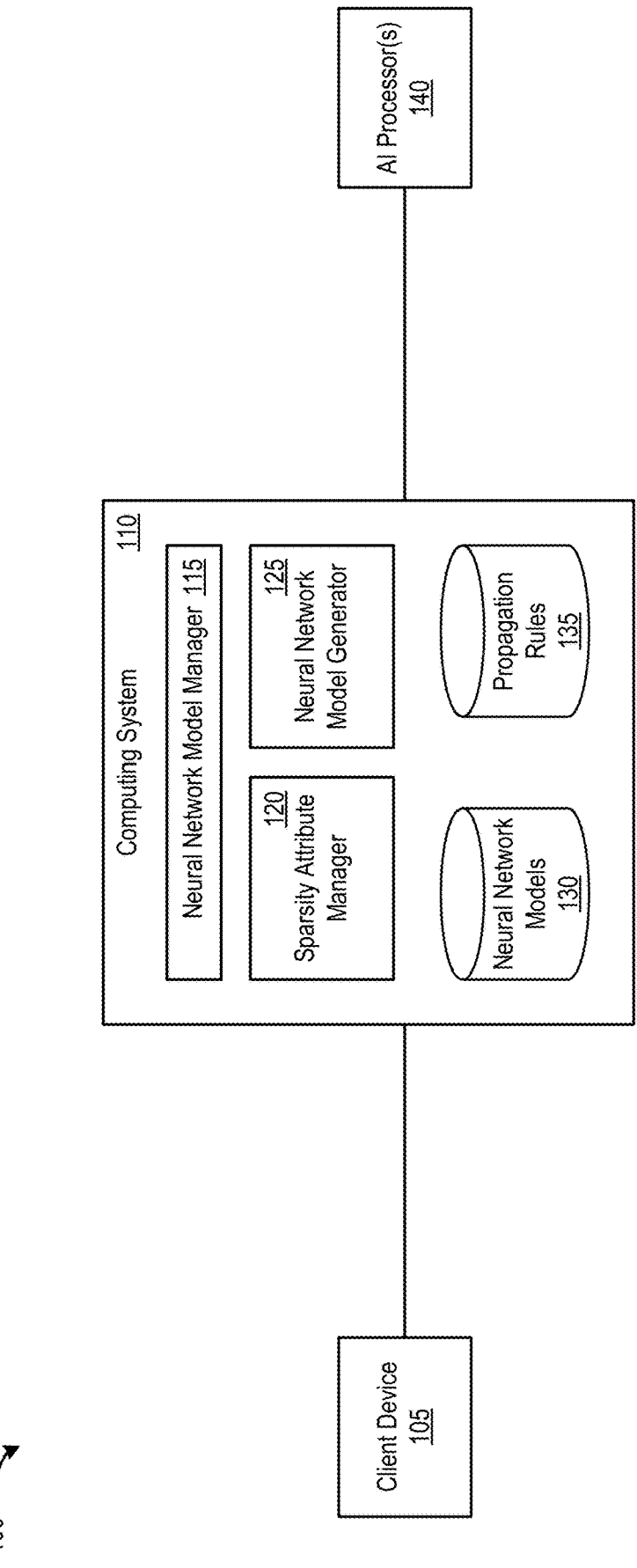
FIG. 1 illustrates a system for providing sparsity for neural network models based on sparsity attributes according to some embodiments.

FIG. 1 illustrates a system 100 for providing sparsity for neural network models based on sparsity attributes according to some embodiments. As shown, system 100 includes client device 105, computing system 110, and artificial intelligence (AI) processor(s) 140. Client device 105 is configured to interact and communicate with computing system 110. For instance, a user of client device 105 can send computing system 110 a neural network definition. As mentioned above, in some embodiments, a neural network definition may be specified in a data flow graph format that defines the neural network model in terms of tensors and operators for implementing the functionality of the neural network model. In addition, the user of client device 105 may send computing system 110 sparsity attribute values for one or more tensors in the neural network model.

Figure 2:
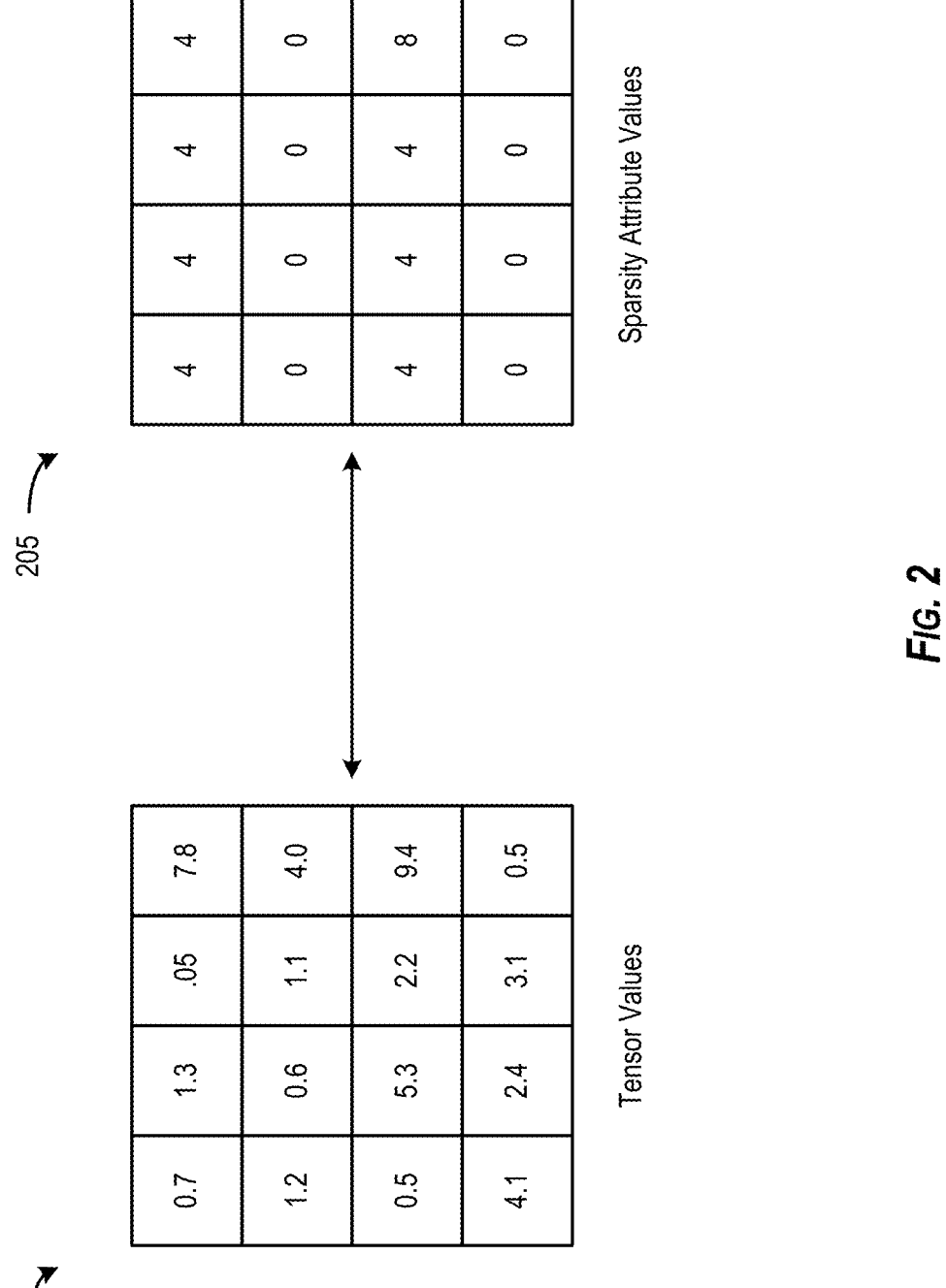
FIG. 2 illustrates example sparsity attributes according to some embodiments.

FIG. 2 illustrates example sparsity attributes according to some embodiments. Specifically, FIG. 2 illustrates tensor 200 and sparsity attributes 205. Here, tensor 200 is a 4×4 matrix (i.e., a 4 row by 4 column matrix) of elements storing tensor value (decimal numbers in this example). Sparsity attributes 205 is also a 4×4 matrix of elements storing sparsity attribute values. In some embodiments, a sparsity attribute value specifies how to sparsify a particular corresponding element in a tensor. In this example, a sparsity attribute value of 0 specifies to prune a corresponding element in tensor 200 (e.g., set the value of the corresponding element in tensor 200 to 0), a sparsity attribute value of 4 specifies to quantize the value in a corresponding element in tensor 200 to a 4-bit unsigned numerical value, a sparsity value of 8 specifies to quantize the value in a corresponding element in tensor 200 to an 8-bit unsigned numerical value. As such, sparsity attributes 205 specifies to quantize the values in the first row of tensor 200 to 4-bit unsigned numerical values, prune the second row of tensor 200, quantize the first three values in the third row of tensor 200 to 4-bit unsigned numerical values, quantize the last value in the third row of tensor 200 to an 8-bit unsigned numerical value, and prune the fourth row of elements in tensor 200. Sparsity attributes 205 is just one example of specifying sparsity attribute values for a tensor. One of ordinary skill in the art will appreciate that any number of different methods for specifying sparsity attribute values for elements in a tensor may be used in different embodiments.

Returning to FIG. 1, AI processor(s) 140 is hardware configured to implement and execute neural network models. AI processor(s) 140 may include graphics processors (GPUs), AI accelerators, or other digital processors optimized for AI operations. For instance, AI processor(s) 140 may receive a neural network model, a set of training data from computing system 110, and instructions how to train the neural network model. In response, AI processor(s) 140 uses the set of training data to train the neural network model according to the instructions. As another example, AI processor(s) 140 can receive a trained neural network model and input data. In response, AI processor(s) 140 executes the trained neural network model base on the input data in order to generate a set of outputs (e.g., using the trained neural network model for inference).

As shown in FIG. 1, computing system 110 includes neural network model manager 115, sparsity attribute manager 120, neural network model generator 125, neural network models storage 130, and propagation rules storage 135. Neural network models storage 130 is configured to store neural network model definitions, augmented neural network model definitions, executable neural network models, training data for training neural network models, trained neural network models, etc. Propagation rules storage 135 can store propagation rules for propagating sparsity attribute values. In some cases, a propagation rule may be a pruning rule that specifies how to propagate pruned elements in a tensor to other tensors in a neural network model. In other cases, a propagation rule may be a quantization rule that specifies how to propagate quantized elements in a tensor to other tensors in a neural network model. In some embodiments, storages 130 and 135 are implemented in a single physical storage while, in other embodiments, storages 130 and 135 may be implemented across several physical storages. While FIG. 1 shows storages 130 and 135 as part of computing system 110, one of ordinary skill in the art will appreciate that neural network models storage 130 and/or propagation rules storage 135 may be external to computing system 110 in some embodiments.

Neural network model manager 115 is responsible for managing neural network models. For example, neural network model manager 115 can receive a neural network model definition from client device 105. As explained above, in some embodiments, a neural network definition may be specified in a data flow graph format that defines the neural network model in terms of tensors and operators for implementing the functionality of the neural network model. In addition to a neural network model definition, neural network model manager 115 may receive sparsity attribute values for one or more tensors in the neural network model. In some embodiments, neural network model manager 115 can receive a neural network model definition and sparsity attribute values for a set of tensors in the neural network model from any number of different sources. For instance, neural network model manager 115 may receive a neural network model definition and sparsity attribute values for a set of tensors in the neural network model from an application, service, or the like, operating on computing system 110. Upon receiving a neural network model definition and sparsity attribute values for a set of tensors in the neural network model, neural network model manager 115 sends them to sparsity attribute manager 120. In some instances, neural network model manager 115 stores the neural network model definition and the sparsity attribute values in neural network models storage 130.

In addition, neural network model manager 115 can receive from sparsity attribute manager 120 an augmented neural network model definition. In response to receiving it, neural network model manager 115 sends the augmented neural network model definition to neural network model generator 125 for further processing. In some cases, neural network model manager 115 stores the augmented neural network model definition in neural network models storage 130. Next, neural network model manager 115 may receive an executable neural network model from neural network model generator 125, which neural network model manager 115 stores in neural network models storage 130.

Neural network model manager 115 is also configured to train neural network models and use them for inference. For example, neural network model manager 115 may receive (from client device 105 or an application or service operating on computing system 110) a request to train a neural network model. In response to the request, neural network model manager 115 accesses neural network models storage 130 to retrieve the requested neural network model and a set of training data. Then, neural network model manager 115 sends AI processor(s) 140 the neural network model, the set of training data, and instructions how to train the neural network model. Once trained, neural network model manager 115 can store the trained neural network model in neural network models storage 130. As another example, neural network model manager 115 receive (from client device 105 or an application or service operating on computing system 110) a request to use a trained neural network model for inference along with a set of input data. In response to the request, neural network model manager 115 accesses neural network models storage 130 to retrieve the trained neural network model. Neural network model manager 115 then sends the trained neural network model and the set of input data to AI processor(s) 140 for processing. In some cases, neural network model manager 115 stores the set of outputs generated by the neural network model based on the set of input data.

Sparsity attribute manager 120 is configured to manage sparsity attributes for neural network models. For instance, sparsity attribute manager 120 may receive from neural network model manager 115 a neural network model definition and sparsity attribute values for a set of tensors in the neural network model. In response, sparsity attribute manager 120 accesses propagation rules storage 135 to retrieve a set of propagation rules and propagates the set of sparsity attribute values through the neural network model based on the set of propagation rules. After propagating sparsity attribute values through the neural network model, sparsity attribute manager 120 sends the neural network model definition (referred to as an augmented neural network model definition) to neural network model manager 115.

As mentioned above, a propagation rule may be a pruning rule that specifies how to propagate pruned elements in a tensor to other tensors in a neural network model. FIG. 3 illustrates example pruning rules 300 according to some embodiments. In particular, pruning rules 300 are divided into two types of operators: unary operators (e.g., sin, cosine, absolute value, a rectified linear unit (ReLU) activation function, etc.) and binary operators (e.g., addition, subtraction, multiplication, division, power function, etc.). In this example, $\phi$ represents a pruned element and a represents a non-pruned element. For the unary operators, pruning rules 300 specify that if an input element is indicated to be pruned, the corresponding output element is also indicated to be pruned. Similarly, if an input element is indicated to not be pruned, the corresponding output element is indicated to not be pruned. For the binary operators, pruning rules 300 are divided further into two sets of computations: a first set of computations that include addition and subtraction and a second set of computations that include multiplication, division, and power function. For the first set of binary computations, pruning rules 300 specify that if both of the input elements x and y are indicated to be pruned, then the corresponding output element is also indicated to be pruned. Additionally, if either of the input elements x or y is indicated to not be pruned, then the corresponding output element is indicated to not be pruned. For the second set of binary computations, pruning rules 300 specify that if either of the input elements x or y is indicated to be pruned, then the corresponding output element is also indicated to be pruned. Also, if both of the input elements x and y are indicated to not be pruned, then the corresponding output element is indicated to not be pruned. Pruning rules 300 is just one example of pruning rules for propagating pruning attribute values. One of ordinary skill in the art will understand that any number of additional and/or different rules for propagating pruning attribute values in neural network models can be defined in different embodiments.

Figure 4:
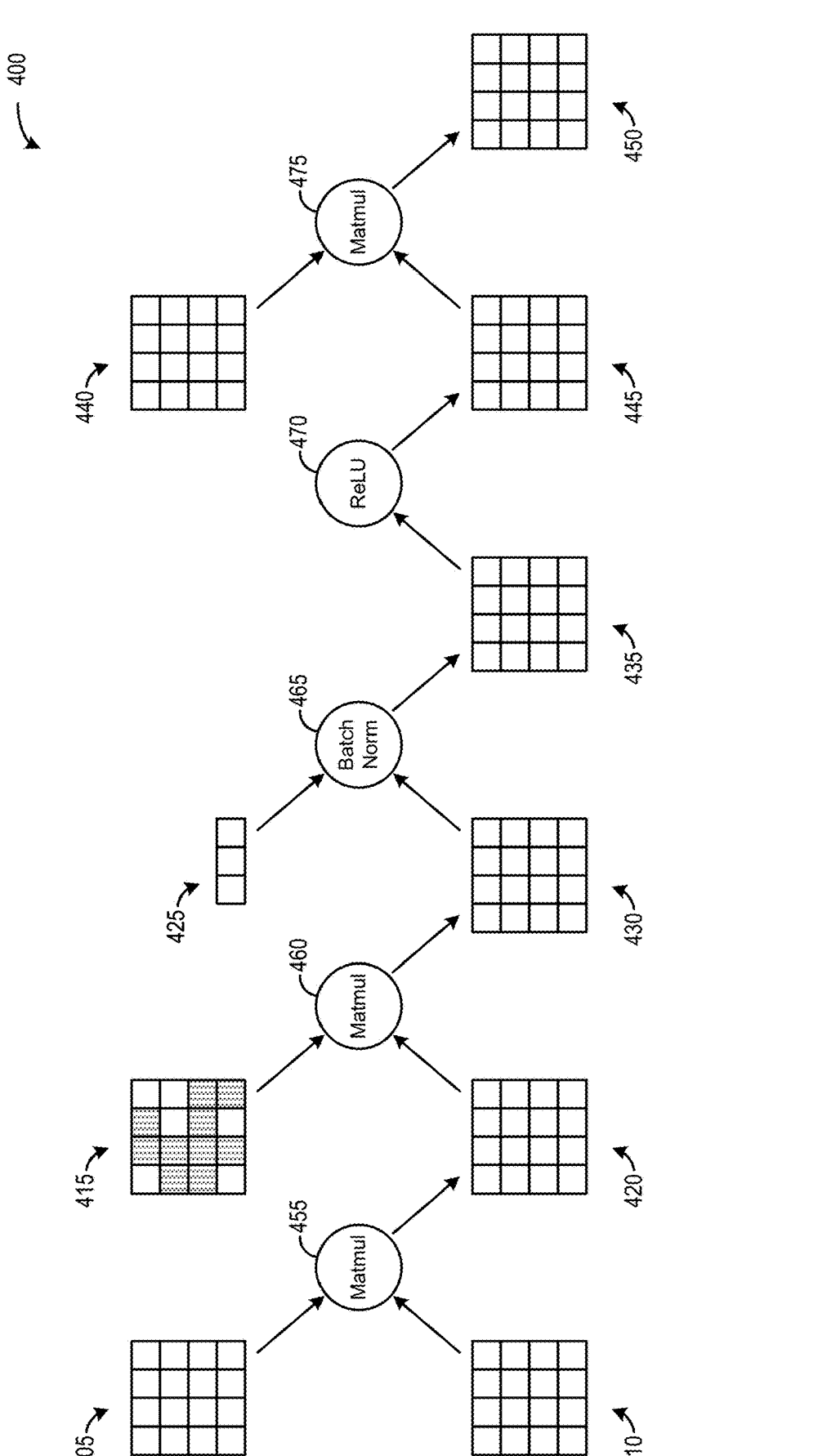
FIG. 4 illustrates an example neural network model definition according to some embodiments.

An example of propagating pruning attribute values will now be described by reference to FIGS. 4 and 5. FIG. 4 illustrates an example neural network model definition 400 according to some embodiments. As shown, neural network model definition 400 includes tensors 405-450 and operators 455-475 for implementing the functionality of a neural network model. For this example, a user of client device 105 provides neural network model definition 400 to computing system 110. As depicted in FIG. 4, tensors 405 and 410 are inputs to a matrix multiplication (matmul) operator 455 (tensor 410•tensor 405), which generates tensor 420 as an output. Tensors 415 and 420 are inputs to matmul operator 460 (tensor 420•tensor 415), which generates tensor 430 as an of the matmul operation. Tensors 425 and 430 are inputs to batch normalization operator 465, which generates tensor 435 as an output. Tensor 435 is the input to ReLU activation function operator 470, which generates tensor 445 as an output. Finally, tensors 440 and 445 are inputs to matmul operator 475 (tensor 445•tensor 440), which generates tensor 450 as an output. In this example, the user of client device 105 also provides sparsity attribute values for tensor 415. Specifically, the user of client device 105 specifies the second and third elements in the first row of tensor 415 to be pruned, the first and second elements in the second row of tensor 415 to be pruned, the all the elements in the third row of tensor 415 to be pruned, and the second and fourth elements in the fourth row of tensor 415 to be pruned. As shown in FIG. 4, the elements to be pruned in tensor 415 are indicated by vertical lines.

Figure 5:
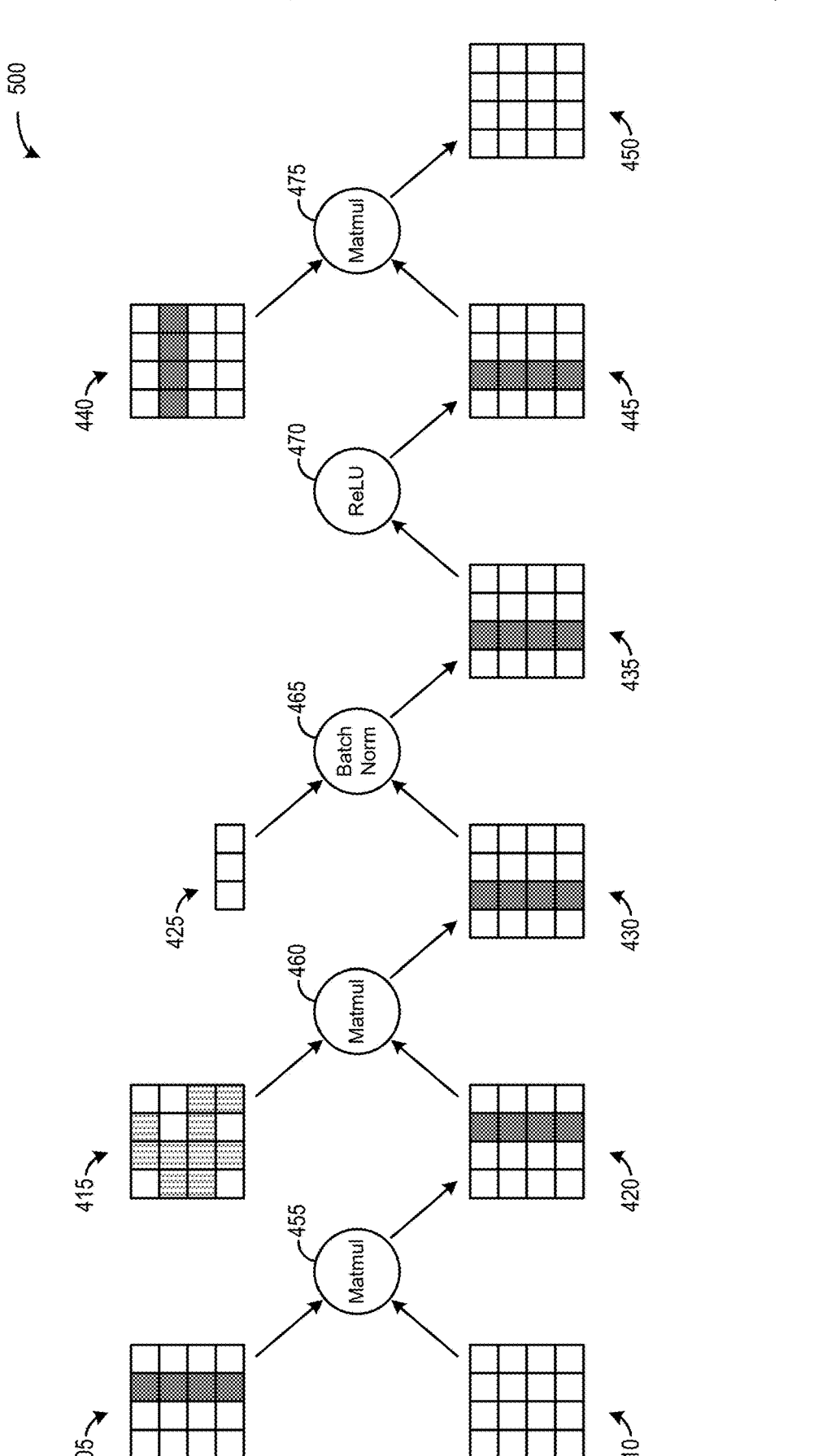
FIG. 5 illustrates propagating pruning attributes through the neural network model defined by the neural network model definition illustrated in FIG. 4 according to some embodiments.

FIG. 5 illustrates propagating pruning attributes through the neural network model defined by the neural network model definition illustrated in FIG. 4 according to some embodiments. In some embodiments, pruning attributes can be propagated forwards through a neural network model as well as backwards through the neural network model. In this example, a pruning rule specifies that when all the elements in a column in the second input tensor of a matrix multiplication operation are indicated to be pruned, the elements in the same corresponding column in the output tensor of the matrix multiplication operation are also indicated to be pruned. This is an example of propagating sparsity attribute values forward through a neural network model. As shown in FIG. 5, all the elements in the second column of tensor 415 are indicated to be pruned. Therefore, sparsity attribute manager 120 propagates these pruning attributes to tensor 430 by setting the sparsity attribute values for the second column of tensor 430 to indicate that these elements are to be pruned, as indicated by a gray shading. Similar pruning rules are applied to propagate pruning attributes to tensors 435 and 445.

For this example, a pruning rule specifies that when all the elements in a row in the second input tensor of a matrix multiplication operation are indicated to be pruned, the elements in the same corresponding column in the first input tensor of the matrix multiplication operation are also indicated to be pruned. This is an example of propagating sparsity attribute values backward through a neural network model. As depicted in FIG. 5, all the elements in the third row of tensor 415 are indicated to be pruned. Hence, sparsity attribute manager 120 propagates these pruning attributes to tensor 420 by setting the sparsity attribute values for the third column of tensor 420 to indicate that these elements are to be pruned, as indicated by a gray shading.

Another pruning rule in this example specifies that when all the elements in a column of an output tensor of a matrix multiplication operation are indicated to be pruned, the elements in the same corresponding column of the second input tensor are also indicated to be pruned. This is another example of propagating sparsity attribute values backward through a neural network model. As illustrated in FIG. 5, all the elements in the third column of output tensor 420 are indicated to be pruned. Thus, all the elements in the corresponding third column of tensor 405, the second input tensor, are also indicated to be pruned.

Yet another pruning rule used in this example specifies that when all the elements in a column of the first tensor of a matrix multiplication operation are indicated to be pruned, the elements in the same corresponding row of the second input tensor are also indicated to be pruned. This is yet another example of propagating sparsity attribute values backward through a neural network model. As shown in FIG. 5, all the elements in the second column of tensor 445, the first input tensor, are indicated to be pruned. As such, all the elements in the corresponding second row of tensor 440, the second input tensor, are also indicated to be pruned.

The example described by reference to FIGS. 4 and 5 show how pruning attributes may be propagated through a neural network model via a variety of different pruning rules. One of ordinary skill in the art will recognize that any number of additional and/or different pruning rules can be defined and used to propagate pruning attributes forwards and/or backwards through a neural network model. For example, in some embodiments, a probabilistic propagation rule may be defined that handles black-box or complex operators. An example of a probabilistic propagation rule can be configured to derive the pruned elements of a tensor by scrambling the values of other related tensors. Specifically, this propagation rule sets the pruned elements in the input tensor to zeros and assigns random values to the remaining elements (i.e., scrambling). It then runs the operator to obtain its output. By repeating this process, the rule treats those elements that always stay zero in an output tensor as pruned elements.

In some embodiments, sparsity attribute manager 120 can propagate quantization attributes through neural network models. To propagate quantization attributes specified for a tensor in a neural network model, sparsity attribute manager 120 may use a quantization rule that identifies tensors in the neural network model that have high quantization precision. Such a quantization rule specifies to identify an operator in a neural network model, perform inference on the neural network model using a training/test dataset, and collect the resulting input and output data of the operator to construct calibration data. Next, the quantization rule specifies to gradually reduce the quantization precision (e.g., 64-bit to 32-bit, 32-bit to 16-bit, 16-bit to 8-bit, etc.) of one tensor of the operator while keeping other tensors unchanged. Then, the operator is quantized and finetuned using the calibration data under the new precision. In some embodiments, the tuning includes minimizing the error (e.g., a mean squared error (MSE), etc.) between the calibration data and the corresponding output with the new precision. If the error is lower than a predefined threshold, the new quantization attribute of that operator is accepted. This process is repeated for other tensors in the operator, until all tensors are evaluated.

Returning to FIG. 1, neural network model generator 125 is configured to generate neural network models. In some embodiments, neural network model generator 125 generates a neural network model specified in a neural network model definition by generating an execution plan, transforming operators in the neural network model into sub-operators, and/or specializing code to generate more efficient code for the neural network model. In some such embodiments, the transformation of operations is performed in a first compilation pass and the specialization of code is performed in a second compilation pass.

In some instances, sparsity attribute values specified for tensors in a neural network model include different sparsity attribute values and/or have different sparsity patterns. These different sparsity attributes/patterns can be complex and the code generated for them may be very inefficient to run. Therefore, neural network model generator 125 may transform operators in a neural network model into sub-operators when neural network model generator 125 detects that a neural network model includes these complex sparsity attribute patterns.

Figure 6A:
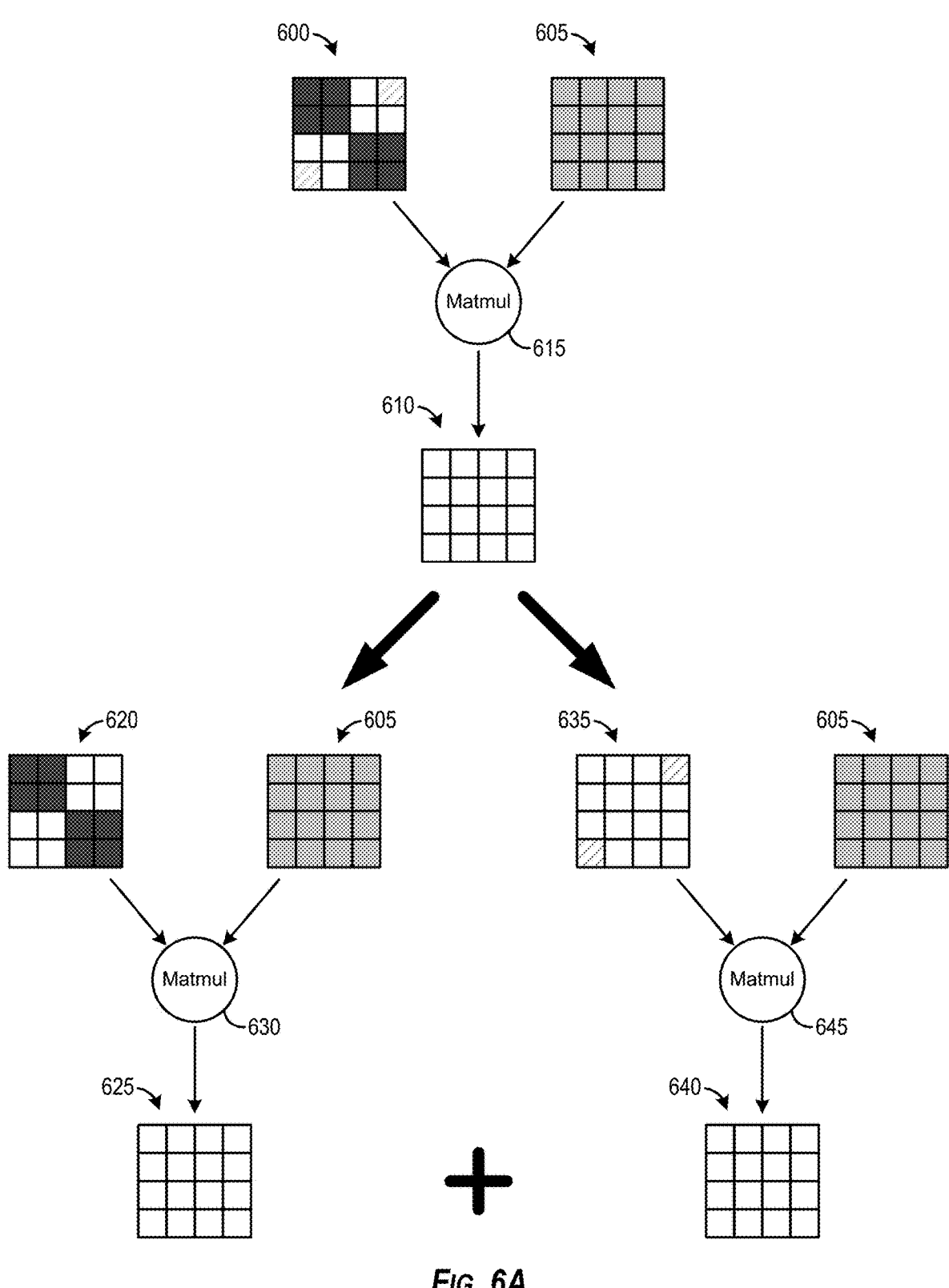
FIGS. 6A and 6B illustrate examples of transforming an operator into sub-operators according to some embodiments.
Figure 6B:
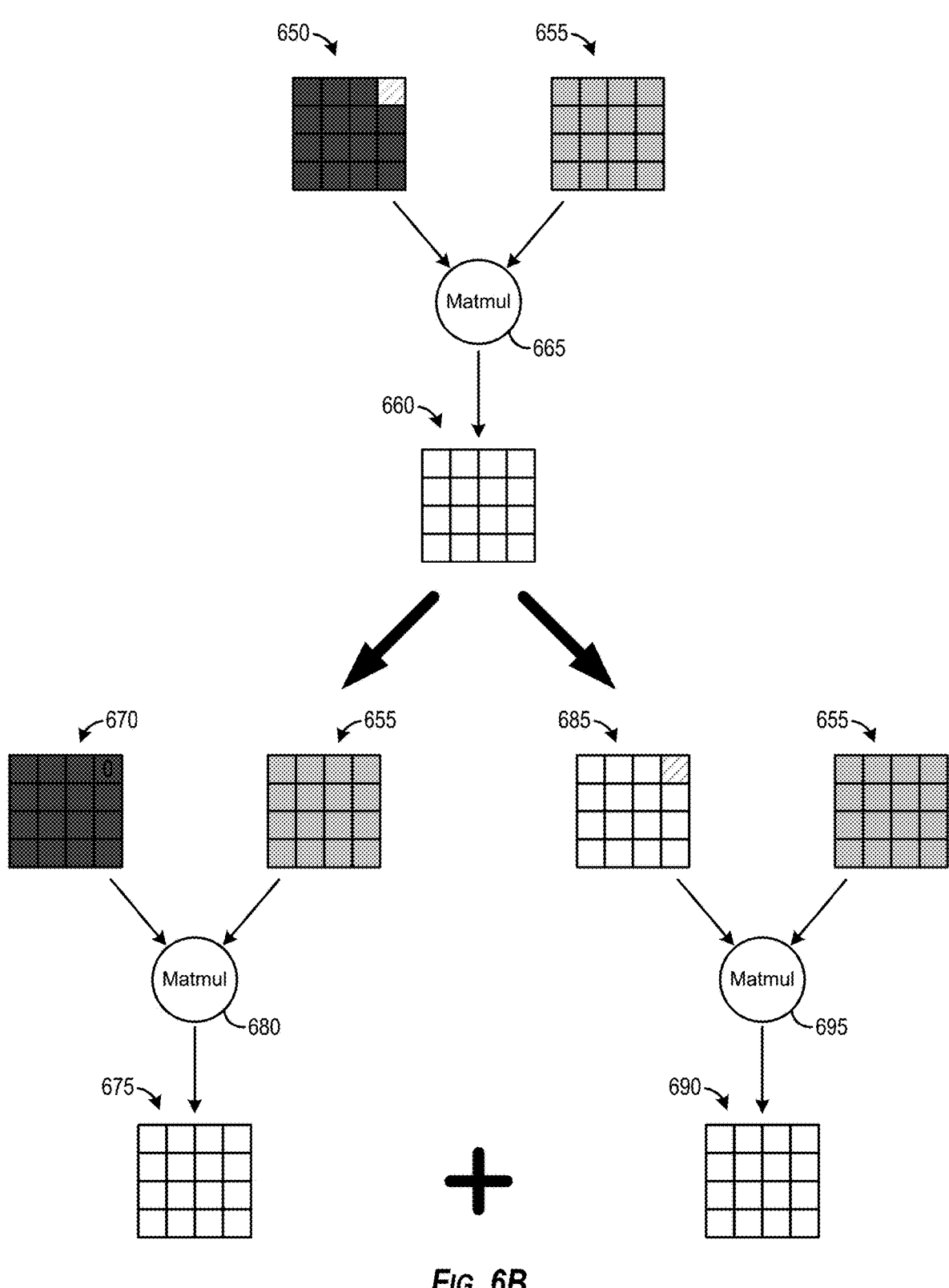

FIGS. 6A and 6B illustrate examples of transforming an operator into sub-operators according to some embodiments. In particular, FIG. 6A illustrates an example of neural network model generator 125 transforming a matmul operator into two matmul operators. FIG. 6A depicts tensors 600 and 605 as inputs to matmul operator 615, which generates tensor 610 as an output. For this example, sparsity attribute values associated with tensor 600 specify that the first and second elements of the first and second rows of tensor 600 and the third and fourth elements of the third and fourth rows of tensor 600 are to be quantized to 8-bit unsigned numerical values, as indicated by a dark gray shading. In addition, the fourth element of the first row of tensor 600 and the first element of the fourth row of tensor 600 are to be quantized to 32-bit unsigned numerical values, as indicated by diagonal lines. Lastly, the third element in the first row of tensor 600, the third and fourth elements in the second row of tensor 600, the first and second elements in the third row of tensor 600, and the second element in the fourth row of tensor 600 are indicated to be pruned, as indicated by a white shading.

In this example, neural network model generator 125 transforms operator 615 into two sub-operators by decomposing operator 615 into sub-operator 630 and sub-operator 645. As shown, sub-operator 630 is a matmul operator that receives tensors 620 and 605 as its inputs and generates tensor 625 as an output. Tensor 620 is similar to tensor 600 except the elements indicated in tensor 600 to be quantized to 32-bit unsigned numerical values are instead indicated to be pruned in tensor 620. Sub-operator 645 is a matmul operator that receives tensors 635 and 605 as its inputs and generates tensor 640 as an output. Tensor 635 is similar to tensor 600 except the elements indicated in tensor 600 to be quantized to 8-bit unsigned numerical values are instead indicated to be pruned in tensor 635. As depicted in FIG. 6A, the output of operators 630 and 645 (i.e., tensors 625 and 640) are added together. The sum is equivalent to the output of operator 615 (i.e., tensor 610).

FIG. 6B illustrates another example of neural network model generator 125 transforming a matmul operator into two matmul operators. FIG. 6B shows tensors 650 and 655 as inputs to matmul operator 665, which generates tensor 660 as an output. Here, sparsity attribute values associated with tensor 650 specify that every element except the fourth element in the first row of tensor 650 are to be quantized to 8-bit unsigned numerical values, as indicated by a dark gray shading. The fourth element in the first row of tensor 650 is to be quantized to a 32-bit unsigned numerical value, as indicated by diagonal lines.

For this example, neural network model generator 125 transforms operator 665 into two sub-operators by decomposing operator 665 into sub-operator 680 and sub-operator 695. As depicted in FIG. 6B, sub-operator 680 is a matmul operator that receives tensors 670 and 655 as its inputs and generates tensor 675 as an output. Tensor 670 is similar to tensor 650 except the element indicated in tensor 650 to be quantized to a 32-bit unsigned numerical value is instead indicated to be quantized to an 8-bit unsigned numerical value in tensor 670 and its value set to zero. Sub-operator 695 is a matmul operator that receives tensors 685 and 655 as its inputs and generates tensor 690 as an output. Tensor 685 is similar to tensor 650 except the elements indicated in tensor 600 to be quantized to 8-bit unsigned numerical values are instead indicated to be pruned in tensor 685. As illustrated, the output of operators 680 and 695 (i.e., tensors 675 and 690) are added together. The sum is equivalent to the output of operator 665 (i.e., tensor 660).

The examples shown in FIGS. 6A and 6B are two examples of transforming operators in a neural network model into sub-operators in order to simplify the sparsity attributes/patterns of tensors of the operators. This, in turn, allows for more efficient code to be generated for the neural network model. One of ordinary skill in the art will appreciate that any number of different methods for transforming operators into sub-operators to reduce the complexity of sparsity attributes/patterns may be used.

As explained above, neural network model generator 125 can perform code specialization as part of the process of generating a neural network model. In some embodiments, neural network model generator 125 performs code specialization on each operator in a neural network model and/or sub-operator generated during the operator transformation process. In some cases, neural network model generator 125 generates code specialization hints during the operator transformation process. For instance, neural network model generator 125 may generate metadata describing the tensors of a sub-operator such as the bit size of elements in a transformed input tensor and a block size used for transforming the operator. The bit width of an operator can suggest whether to leverage a specific hardware instruction.

Referring to FIG. 6A as an example, neural network model generator 125 determines that the bit size of elements in tensor 620 to be 8-bits and the block size to be 2×2. For tensor 635, neural network model generator 125 determines the bit size of elements in tensor 635 to be 32-bits and the block size to be 1×1. Referring to FIG. 6B as another example, neural network model generator 125 determines that the bit size of elements in tensor 670 to be 8-bits and the block size to be 4×4. For tensor 685, neural network model generator 125 determines the bit size of elements in tensor 685 to be 32-bits and the block size to be 1×1.

Figure 7:
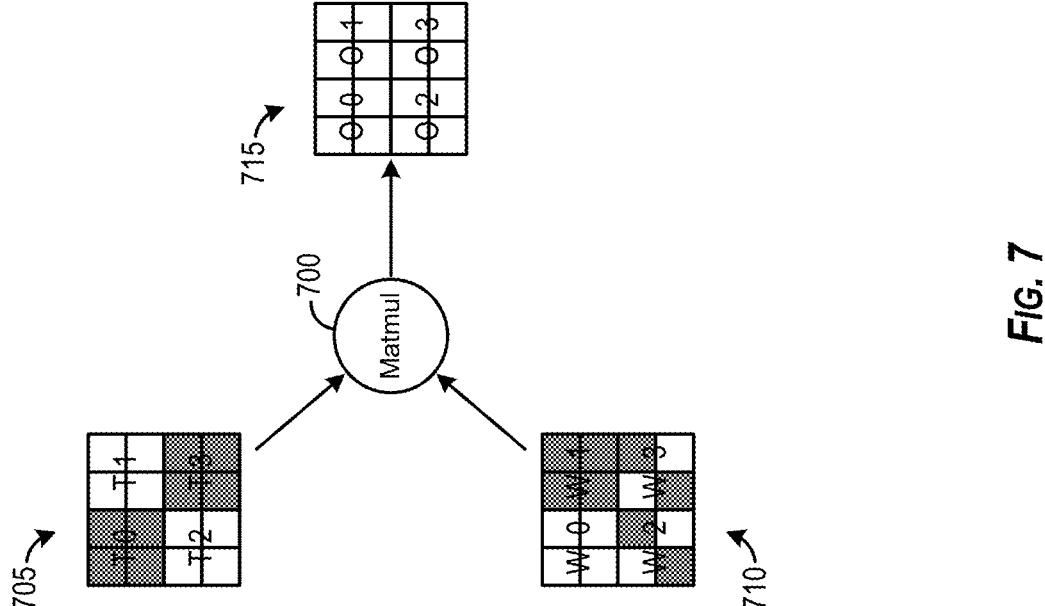
FIG. 7 illustrates an example operator according to some embodiments.

An example of code specialization will now be described by reference to FIGS. 7 and 8. FIG. 7 illustrates an example operator 700 according to some embodiments. As illustrated, operator 700 is a matmul operator that receives tensors 705 and 710 as its inputs. Operator 700 generates tensor 715 as an output of the matmul operation. For this example, sparsity attribute values associated with tensor 705 specify that the first and second elements of the first and second rows of tensor 705 and the third and fourth elements of the third and fourth rows of tensor 705 are to be pruned, as indicated by gray shading. Sparsity attribute values associated with tensor 710 specify that the third and fourth elements in the first and second rows of tensor 710, the second and fourth elements in the third row of tensor 710, and the first and third elements in the fourth row of tensor 705 are to be pruned, as indicated by gray shading. In this example, neural network model generator 125 determines that the specialization hints for tensor 705 to be a bit size of 32 bits and a block size of 2×2. Neural network model generator 125 determines that the specialization hints for tensor 710 to also be a bit size of 32 bits and a block size of 2×2. FIG.

Figure 8A:
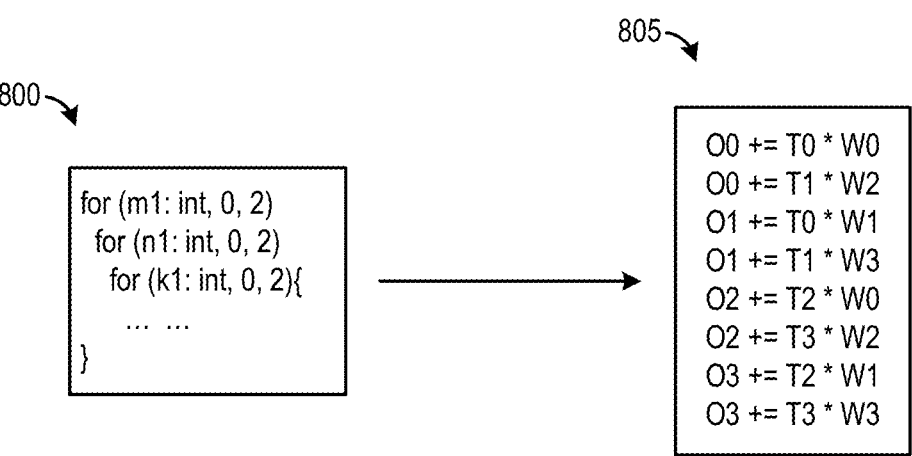
FIGS. 8A and 8B illustrate an example of code specialization according to some embodiments.
Figure 8B:
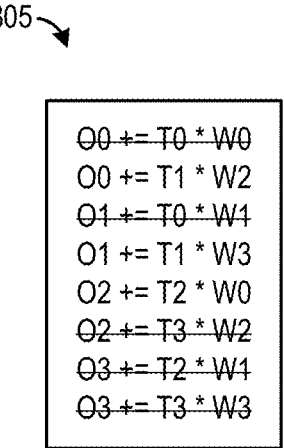

FIGS. 8A and 8B illustrate an example of code specialization according to some embodiments. FIG. 8A shows code 800 that neural network model generator 125 generates for operator 700. Here, neural network model generator 125 begins at the outermost loop until the level of an inner loop body aligns with the block size. Then, neural network model generator 125 unrolls the inner loop and all its outer loops, identifies dead code, and then removes the identified dead code. Neural network model generator 125 determines that the third loop in code 800 aligns with the 2×2 block size. Next, neural network model generator 125 unrolls the outer three loops to generate the set of matmul operations 805. Based on the elements indicated to be pruned in tensors 705 and 710, neural network model generator 125 identifies dead matmul operators in the set of matmul operators 805. FIG. 8B illustrates the dead matmul operators that neural network model generator 125 identified in the set of matmul operators 805. As depicted in FIG. 8B, neural network model generator 125 identified the first, third, sixth, seventh, and eighth matmul operators as being dead operators. Accordingly, neural network model generator 125 removes these matmul operators. FIG. 9 illustrates a sparsified version of operator 700 according to some embodiments. In particular, FIG. 9 illustrates tensor 900 as the output of operator 700. In this example, tensor 900 is the sparsified version of tensor 715 determined based on the identified and removed matmul operations from the set of matmul operations 805. As shown, the third and fourth elements in the third and fourth row of tensor 900 are indicated to be pruned as a result of the removal of the matmul operations depicted in FIG. 8B.

FIG. 10 illustrates a process 1000 for sparsifying a neural network model according to some embodiments. In some embodiments, computing system 110 can perform process 1000. Process 1000 begins by receiving, at 1010 a first neural network model definition, the first neural network model definition specifying a neural network model comprising a set of tensors and a set of sparsity attribute values for elements of a tensor in the set of tensors. Referring to FIGS. 1 and 4 as an example, computing system 110 may receive neural network model definition 400 (e.g., from client device 105). As illustrated in FIG. 4, sparsity attribute values are specified for tensor 415.

Next, process 1000 propagates, at 1020, the set of sparsity attribute values for the tensor to elements of a subset of the set of tensors to form a second neural network model definition. Referring to FIGS. 1 and 5 as an example, sparsity attribute manager 120 may propagate the set of sparsity attribute values associated with tensor 415 to other tensors in neural network model definition 400 (e.g., tensors 405, 420, 430, 435, 440, and 445).

Finally, process 1000 generates, at 1030, the neural network model based on the second neural network model definition. Referring to FIG. 1 as an example, neural network model generator 125 can generate a neural network model specified in an augmented neural network model definition by generating an execution plan, transforming operators in the neural network model into sub-operators, specializing code to generate more efficient code for the neural network model, etc.

Figure 11:
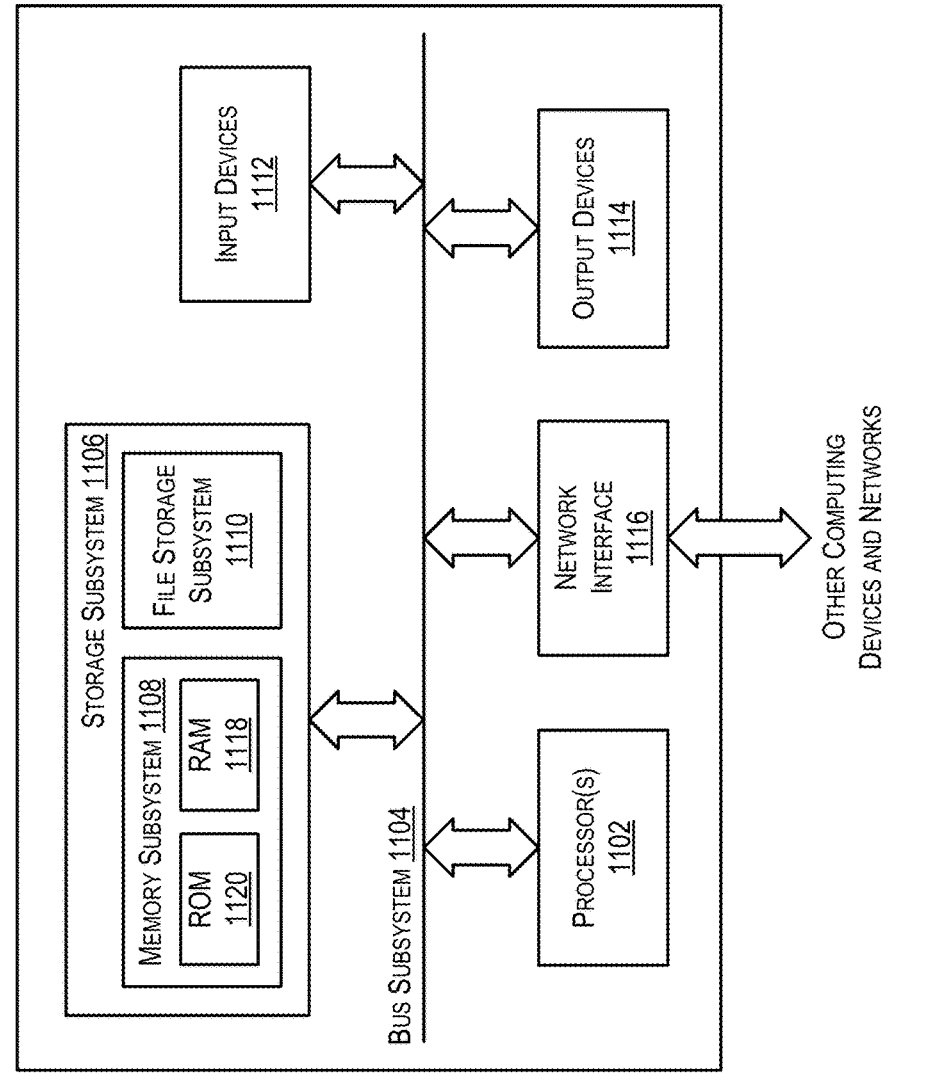
FIG. 11 depicts a simplified block diagram of an example computer system according to some embodiments.

The techniques describe above may be implemented in a wide range of computer systems configured to process neural networks. FIG. 11 depicts a simplified block diagram of an example computer system 1100, which can be used to implement the techniques described in the foregoing disclosure. For example, computer system 1100 may be used to implement client device 105 and computing system 110. As shown in FIG. 11, computer system 1100 includes one or more processors 1102 that communicate with a number of peripheral devices via a bus subsystem 1104. These peripheral devices may include a storage subsystem 1106 (e.g., comprising a memory subsystem 1108 and a file storage subsystem 1110) and a network interface subsystem 1116. Some computer systems may further include user interface input devices 1112 and/or user interface output devices 1114.

Bus subsystem 1104 can provide a mechanism for letting the various components and subsystems of computer system 1100 communicate with each other as intended. Although bus subsystem 1104 is shown schematically as a single bus, alternative embodiments of the bus subsystem can utilize multiple busses.

Network interface subsystem 1116 can serve as an interface for communicating data between computer system 1100 and other computer systems or networks. Embodiments of network interface subsystem 1116 can include, e.g., Ethernet, a Wi-Fi and/or cellular adapter, a modem (telephone, satellite, cable, ISDN, etc.), digital subscriber line (DSL) units, and/or the like.

Storage subsystem 1106 includes a memory subsystem 1108 and a file/disk storage subsystem 1110. Subsystems 1108 and 1110 as well as other memories described herein are examples of non-transitory computer-readable storage media that can store executable program code and/or data that provide the functionality of embodiments of the present disclosure.

Memory subsystem 1108 includes a number of memories including a main random access memory (RAM) 1118 for storage of instructions and data during program execution and a read-only memory (ROM) 1120 in which fixed instructions are stored. File storage subsystem 1110 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than system 1100 are possible.

FIG. 12 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1202, which may comprise architectures illustrated in FIG. 11 above, may be coupled to a plurality of controllers 1210(1)-1210(M) over a communication network 1201 (e.g., switches, routers, etc.). Controllers 1210(1)-1210(M) may also comprise architectures illustrated in FIG. 11 above. Each controller 1210(1)-1210(M) may be coupled to one or more NN processors, such as processors 1211(1)-1211(N) and 1212(1)-1212(N), for example. NN processors 1211(1)-1211(N) and 1212(1)-1212(N) may include a variety of configurations of functional processing blocks and memory optimized for neural network processing, such as training or inference. The NN processors are optimized for neural network computations. Server 1202 may configure controllers 1210 with NN models as well as input data to the models, which may be loaded and executed by NN processors 1211(1)-1211(N) and 1212(1)-1212(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for providing sparsity for neural network models based on sparsity attributes. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device, the program comprising sets of instructions for receiving a first neural network model definition, the first neural network model definition specifying a neural network model comprising a set of tensors and a set of sparsity attribute values for elements of a tensor in the set of tensors; propagating the set of sparsity attribute values for the tensor to elements of a subset of the set of tensors to form a second neural network model definition; and generating the neural network model based on the second neural network model definition.

In one embodiment, the set of sparsity attribute values for elements of the tensor in the set of tensors is a first set of sparsity attribute values for elements of a first tensor in the set of tensors. The neural network model further comprises a set of operators configured to operate on the set of tensors. Generating the executable neural network model comprises transforming an operator in the set of operators operating on second and third tensors in the set of tensors into a plurality of sub-operators.

In one embodiment, transforming the operator into the plurality of sub-operators comprises transforming a second set of sparsity attribute values for elements of the second tensor into a plurality of sets of sparsity attribute values for elements of a plurality of tensors operated on by the plurality of sub-operators. Each set of sparsity attribute values in the plurality of sets of sparsity attribute values comprises at least one sparsity attribute value in the second set of sparsity attribute values.

In one embodiment, generating the executable neural network model further comprises generating a plurality of code for the plurality of sub-operators to implement the operator, identifying a set of dead code in the plurality of code, and eliminating the set of dead code from the plurality of code.

In one embodiment, the set of sparsity attribute values comprises a sparsity attribute value indicating to prune an element in the tensor.

In one embodiment, wherein the set of sparsity attribute values comprises a sparsity attribute value indicating to quantize an element in the tensor.

In one embodiment, propagating the set of sparsity attribute values comprises propagating the set of sparsity attribute values forwards through the neural network model.

In one embodiment, propagating the set of sparsity attribute values comprises propagating the set of sparsity attribute values backwards through the neural network model.

In one embodiment, propagating the set of sparsity attribute values for the tensor to the elements of the subset of the set of tensors is based on a set of propagation rules.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:

receiving a first neural network model definition, the first neural network model definition specifying a neural network model comprising a set of tensors and a set of sparsity attribute values for elements of a tensor in the set of tensors;

performing structural propagation of the sparsity attribute values as metadata of the first neural network model definition by applying a predefined set of operator-specific structural propagation rules that, based on data-flow-graph connectivity of the first neural network model definition, determine pruned or quantized tensor elements and assign corresponding sparsity attributes to elements of a subset of the set of tensors;

constructing a second neural network model definition that encodes the propagated sparsity attribute values; and generating the neural network model based on the second neural network model definition, wherein generating the neural network model comprises transforming an operator in the set of operators operating on second and third tensors in the set of tensors into a plurality of sub-operators.

2. The non-transitory machine-readable medium of claim 1, wherein the set of sparsity attribute values for elements of the tensor in the set of tensors is a first set of sparsity attribute values for elements of a first tensor in the set of tensors, wherein the neural network model further comprises a set of operators configured to operate on the set of tensors.

3. The non-transitory machine-readable medium of claim 2, wherein transforming the operator into the plurality of sub-operators comprises transforming a second set of sparsity attribute values for elements of the second tensor into a plurality of sets of sparsity attribute values for elements of a plurality of tensors operated on by the plurality of sub-operators, wherein each set of sparsity attribute values in the plurality of sets of sparsity attribute values comprises at least one sparsity attribute value in the second set of sparsity attribute values.

4. The non-transitory machine-readable medium of claim 2, wherein generating the executable neural network model further comprises generating a plurality of code for the plurality of sub-operators to implement the operator, identifying a set of dead code in the plurality of code, and eliminating the set of dead code from the plurality of code.

5. The non-transitory machine-readable medium of claim 1, wherein the set of sparsity attribute values comprises a sparsity attribute value indicating to prune an element in the tensor.

6. The non-transitory machine-readable medium of claim 1, wherein the set of sparsity attribute values comprises a sparsity attribute value indicating to quantize an element in the tensor.

7. The non-transitory machine-readable medium of claim 1, wherein propagating the set of sparsity attribute values comprises propagating the set of sparsity attribute values forwards through the neural network model.

8. The non-transitory machine-readable medium of claim 1, wherein propagating the set of sparsity attribute values comprises propagating the set of sparsity attribute values backwards through the neural network model.

9. The non-transitory machine-readable medium of claim 1, wherein propagating the set of sparsity attribute values for the tensor to the elements of the subset of the set of tensors is based on a set of propagation rules.

10. A method comprising:

receiving a first neural network model definition, the first neural network model definition specifying a neural network model comprising a set of tensors and a set of sparsity attribute values for elements of a tensor in the set of tensors;

performing structural propagation of the sparsity attribute values as metadata of the first neural network model definition by applying a predefined set of operator-specific structural propagation rules that, based on data-flow-graph connectivity of the first neural network model definition, determine pruned or quantized tensor elements and assign corresponding sparsity attributes to elements of a subset of the set of tensors;

constructing a second neural network model definition that encodes the propagated sparsity attribute values; and generating the neural network model based on the second neural network model definition, wherein generating the neural network model comprises transforming an operator in the set of operators operating on second and third tensors in the set of tensors into a plurality of sub-operators.

11. The method of claim 10, wherein the set of sparsity attribute values for elements of the tensor in the set of tensors is a first set of sparsity attribute values for elements of a first tensor in the set of tensors, wherein the neural network model further comprises a set of operators configured to operate on the set of tensors.

12. The method of claim 11, wherein transforming the operator into the plurality of sub-operators comprises transforming a second set of sparsity attribute values for elements of the second tensor into a plurality of sets of sparsity attribute values for elements of a plurality of tensors operated on by the plurality of sub-operators, wherein each set of sparsity attribute values in the plurality of sets of sparsity attribute values comprises at least one sparsity attribute value in the second set of sparsity attribute values.

13. The method of claim 11, wherein generating the executable neural network model further comprises generating a plurality of code for the plurality of sub-operators to implement the operator, identifying a set of dead code in the plurality of code, and eliminating the set of dead code from the plurality of code.

14. The method of claim 10, wherein the set of sparsity attribute values comprises a sparsity attribute value indicating to prune an element in the tensor.

15. The method of claim 10, wherein the set of sparsity attribute values comprises a sparsity attribute value indicating to quantize an element in the tensor.

16. The method of claim 10, wherein propagating the set of sparsity attribute values comprises propagating the set of sparsity attribute values forwards through the neural network model.

17. The method of claim 10, wherein propagating the set of sparsity attribute values comprises propagating the set of sparsity attribute values backwards through the neural network model.

18. The method of claim 10, wherein propagating the set of sparsity attribute values for the tensor to the elements of the subset of the set of tensors is based on a set of propagation rules.

19. A system comprising:

a set of processing units; and a non-transitory machine-readable medium storing instructions that when executed by at least one processing unit in the set of processing units cause the at least one processing unit to:

receive a first neural network model definition, the first neural network model definition specifying a neural network model comprising a set of tensors and a set of sparsity attribute values for elements of a tensor in the set of tensors;

perform structural propagation of the sparsity attribute values as metadata of the first neural network model definition by applying a predefined set of operator-specific structural propagation rules that, based on data-flow-graph connectivity of the first neural network model definition, determine pruned or quantized tensor elements and assign corresponding sparsity attributes to elements of a subset of the set of tensors;

construct a second neural network model definition that encodes the propagated sparsity attribute values and generate the neural network model based on the second neural network model definition, wherein generating the neural network model comprises transforming an operator in the set of operators operating on second and third tensors in the set of tensors into a plurality of sub-operators.

20. The system of claim 19, wherein the set of sparsity attribute values for elements of the tensor in the set of tensors is a first set of sparsity attribute values for elements of a first tensor in the set of tensors, wherein the neural network model further comprises a set of operators configured to operate on the set of tensors.

* * * * *